US009785188B1

(12) United States Patent
Schwager et al.

(10) Patent No.: US 9,785,188 B1
(45) Date of Patent: Oct. 10, 2017

(54) SYSTEM FOR INTEGRATED MAGNETIC RETENTION

(71) Applicant: Dell Products L.P., Round Rock, TX (US)

(72) Inventors: Mark Schwager, Cedar Park, TX (US); Julian Spencer, Cedar Park, TX (US); Shu Hao Lu, New Taipei (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/233,508

(22) Filed: Aug. 10, 2016

(51) Int. Cl.
*G06F 1/16* (2006.01)
*E05C 17/56* (2006.01)

(52) U.S. Cl.
CPC .......... *G06F 1/1618* (2013.01); *G06F 1/1616* (2013.01); *G06F 1/1635* (2013.01); *G06F 1/1637* (2013.01); *G06F 1/1679* (2013.01); *G06F 1/1681* (2013.01); *G06F 1/1615* (2013.01); *G06F 1/1626* (2013.01)

(58) Field of Classification Search
CPC .... G06F 1/1615; G06F 1/1616; G06F 1/1618; G06F 1/162
USPC ...................... 361/679.55, 679.58; 292/251.5
See application file for complete search history.

(56) References Cited

U.S. PATENT DOCUMENTS

| | | | | |
|---|---|---|---|---|
| 6,653,919 | B2* | 11/2003 | Shih-Chung | G06F 1/162 24/303 |
| 2014/0043735 | A1* | 2/2014 | Han | H05K 7/00 361/679.01 |
| 2014/0306463 | A1* | 10/2014 | Ho | E05C 19/16 292/251.5 |
| 2016/0154428 | A1* | 6/2016 | Senatori | G06F 1/1616 361/679.27 |
| 2017/0045912 | A1* | 2/2017 | Hsu | G06F 1/1616 |

* cited by examiner

*Primary Examiner* — Nidhi Thaker
(74) *Attorney, Agent, or Firm* — Baker Botts L.L.P.

(57) ABSTRACT

A portable information handling system (IHS), including a housing having a main housing portion, a lid housing portion, and a hinge assembly rotatably coupling the main housing portion and the lid housing portion to rotate the lid housing portion through a plurality of angular positions relative to the main housing portion is disclosed. The plurality of positions include a closed position and a tablet position. The portable IHS further includes a lid magnet assembly in the lid housing portion including a point on the lid magnet assembly closest to the hinge assembly in the tablet position at a first position on a y-axis; and a main magnet assembly in the main housing portion including a point on the main magnet assembly closest to the hinge assembly in the tablet position at a second position on a y-axis, wherein the second position is approximately the same as the first position.

17 Claims, 4 Drawing Sheets

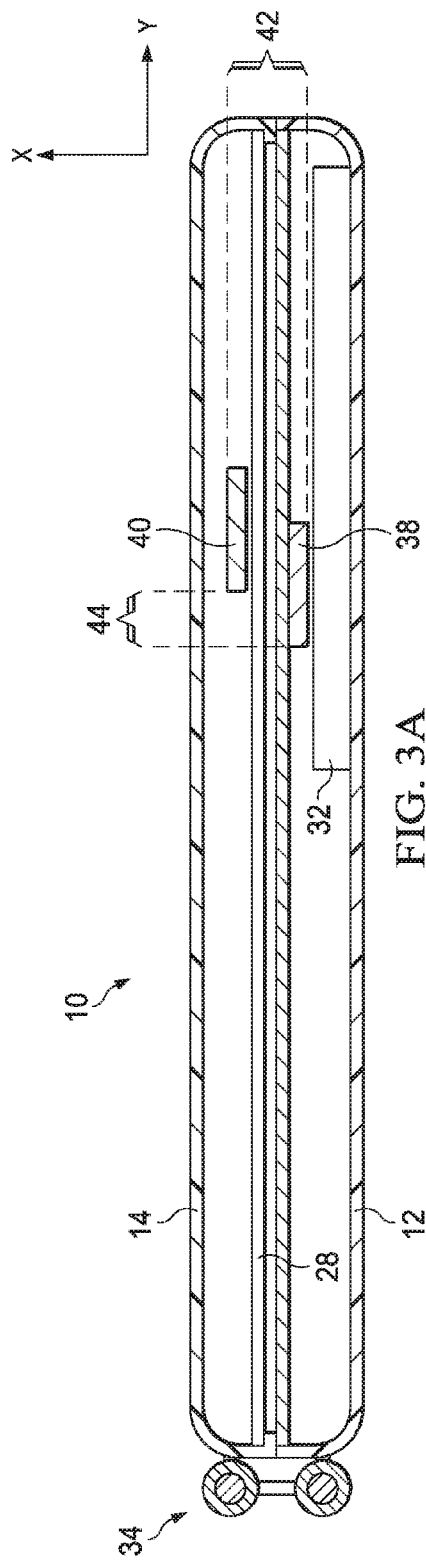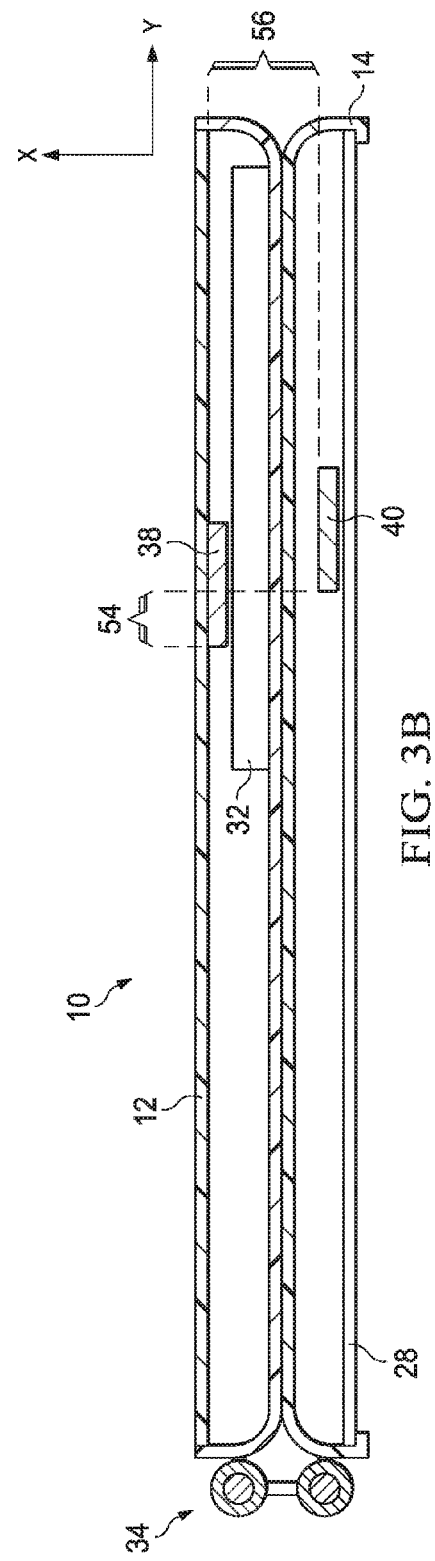

SYSTEM FOR INTEGRATED MAGNETIC RETENTION

TECHNICAL FIELD

This disclosure relates generally to information handling systems and, more particularly, to a system for integrated magnetic retention.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

A portable information handling system includes a housing having a main housing portion and a lid housing portion a hinge assembly rotatably coupling the main housing portion and the lid housing portion to rotate the lid housing portion through a plurality of angular positions relative to the main housing portion. The plurality of positions includes a closed position where the lid housing portion is rotated approximately 0 degrees relative to the main housing portion, and a tablet position where the lid housing portion is rotated approximately 360 degrees relative to the lid housing portion. The portable information handling system further includes a lid magnet assembly in the lid housing portion, and a main magnet assembly in the main housing portion, wherein, in the closed position, the display is located between the lid magnet assembly and the main magnet assembly.

SUMMARY

A portable information handling system, including a housing having a main housing portion and a lid housing portion, and a hinge assembly rotatably coupling the main housing portion and the lid housing portion to rotate the lid housing portion through a plurality of angular positions relative to the main housing portion is disclosed. The plurality of positions including a closed position where the lid housing portion is rotated approximately 0 degrees relative to the main housing portion, and a tablet position where the lid housing portion is rotated approximately 360 degrees relative to the lid housing portion. The portable information handling system further includes a lid magnet assembly in the lid housing portion including a point on the lid magnet assembly closest to the hinge assembly in the tablet position that is located at a first position on a y-axis; and a main magnet assembly in the main housing portion including a point on the main magnet assembly closest to the hinge assembly in the tablet position that is located at a second position on a y-axis, wherein the second position is approximately the same as the first position. The portable information handling system includes a z-axis is defined to be parallel to the hinge assembly and to run through a rotational axis of the hinge assembly, the y-axis is defined to be perpendicular to the z-axis and parallel to the main housing portion; and an x-axis is defined to be perpendicular to the z-axis and perpendicular to the y-axis.

BRIEF DESCRIPTION OF THE DRAWINGS

For a more complete understanding of the present disclosure and its features and advantages, reference is now made to the following description, taken in conjunction with the accompanying drawings, in which:

FIG. 3A is a side cross sectional view of a portable information handling system in a closed position, in accordance with some embodiments of the present disclosure;

FIG. 3B is a side cross sectional view of a portable information handling system in a tablet position, in accordance with some embodiments of the present disclosure.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to the following figures, wherein like numbers are used to indicate like and corresponding parts.

Figure 1:
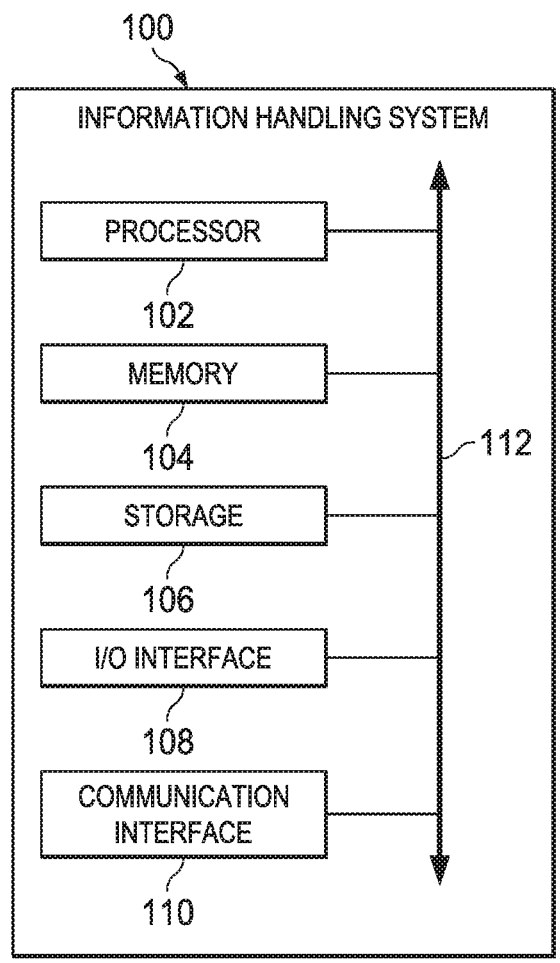
FIG. 1 illustrates a block diagram of selected elements of an embodiment of an information handling system, in accordance with some embodiments of the present disclosure.

FIG. 1 is a block diagram of selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes processor 102, memory 104, storage 106, input/output (I/O) interface 108, communication interface 110, and bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation look aside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate access to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or I/O interconnect.

In particular embodiments, information handling system 100 may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. Information handling system 100 may include networking or communication interfaces 110 that support IEEE 802.11 WLAN protocols (including a, b, g, n, or ac), single or dual band WiFi, BLUETOOTH communication, and near field communication (NFC). Information handling system 100 may include one or more operating systems, including versions of Android, Windows, Wyse ThinOS, Linux, or Apple iOS. Information handling system 100 may include one or more native applications, including, for example, a browser, a media player and recorder, voice over IP and video communication software, and software for remote access to cloud services or other remote content or services.

Information handling system 100 may include display 114. Display 114 may be electrically coupled to information handling system 100 with a cable, wireless, or using any suitable electrical interconnection between display 114 and information handling system 100. Display 114 may be physically coupled to information handling system 100 or may be remote from information handling system 100. For example, in some embodiments, display 114 may be integrally formed with information handling system 100. In some embodiments, display 114 may be coupled to information handling system 100 with a hinge. In further embodiments, display 114 may be remote from information handling system 100. In yet further embodiments, components of information handling system 100 may be distributed between multiple physical housings, including, for example, a housing of display 114.

Figure 2:
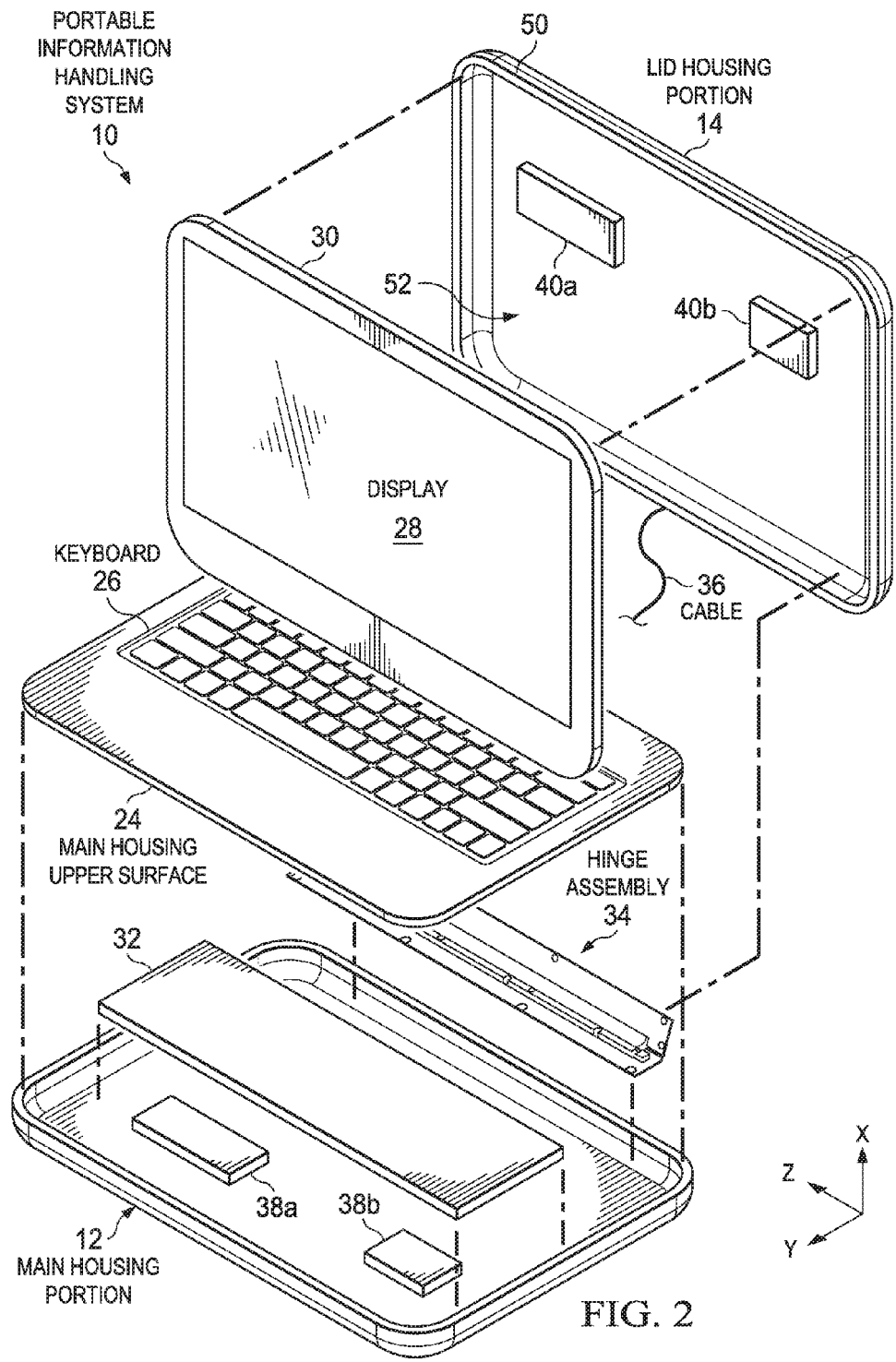
FIG. 2 illustrates an example cross section of a display, in accordance with embodiments of the present disclosure.

FIG. 2 depicts a blown-up view of a portable information handling system having rotationally-coupled housing portions. For convenience, a common set of axes are illustrated on FIGS. 2-4. These axes are for the purpose of illustrating how various components may be arranged with respect to one another, and are not intended to define particular measurements of components. The z-axis runs parallel to and lengthwise along hinge assembly 34, and in a rotational axis of hinge assembly 34. The y-axis is perpendicular to the z-axis and runs parallel to main housing portion 12. The x-axis is perpendicular to both the z-axis and y-axis.

In the example embodiment, a main housing portion 12 rotationally couples to a lid housing portion 14 to support various configurations for interact with an end user. Main housing portion 12 may hold one or more components of the portable information handling system, including but not limited to processor 102, bus 112, memory 104, I/O interface 108, storage 106, and communications interface 110 discussed above with respect to FIG. 1. Main housing portion 12 may further include a portable power source, such as battery 32. Main housing upper surface 24 couples to main housing portion 12, and may include an integrated keyboard 26 or other I/O devices, such as a mouse or microphone (not shown).

Main housing portion 12 may further include main magnet assemblies 38a and 38b (collectively "main magnet assemblies 38"). Main magnet assemblies 38 may include one or more magnets. Magnets may be formed from a ferrous material, may be neodymium magnets, or may be formed from any other suitable magnetic material. In embodiments where a magnet is a neodymium magnet, neodymium 35 to neodymium 52 may be used. In some embodiments, magnets may be formed from neodymium 45.

Lid housing portion 14 may rotationally couple to main housing portion 12 via hinge assembly 34. Hinge assembly 34 may include cable 36 for communicably coupling one or more components within main housing portion 12 to one or more components within lid housing portion 14. Lid housing portion 14 includes display 28 that visually presents information to the user. Display 28 may be retained within recess 52 in lid housing portion 14. Recess 52 may be formed by a back portion and sidewall portions. Display 28 may be a touch panel with circuitry enabling touch functionality in conjunction with a display. Lid housing portion 14 may include bezel 30, which may operate to retain display 28 within lid housing portion 14. Bezel 30 may include a rim that partially overlaps display 28. Bezel 30 may connect to sidewall portion 50 of lid housing portion 14.

Lid housing portion 14 may further include lid magnet assemblies 40a and 40b (collectively "lid magnet assemblies 40"). Lid magnet assemblies 40 may include one or more magnets. Magnets may be formed from a ferrous material, may be neodymium magnets, or may be formed from any other suitable magnetic material. In embodiments where a magnet is a neodymium magnet, neodymium 35 to neodymium 52 may be used. In some embodiments, magnets may be formed from neodymium 45.

Hinge assembly 34 may allow main housing portion 12 and lid housing portion 14 to rotate between a plurality of positions. For example, when portable information handling system 10 is not in use, lid housing portion 14 may be closed over the top of main housing portion 12 so that display 28 and keyboard 26 are protected from unintended use or damage. In this closed position, lid housing portion 14 may be rotated by approximately 0 degrees from main housing portion 12. Rotation of lid housing portion 14 by approximately 90 degrees from main housing portion 12 brings display 28 to a raised "clamshell" position relative to keyboard 26 so that an end user can make inputs to keyboard 26 and/or a touch panel portion of display 28 while viewing display 28. In some embodiments, clamshell position may include positions where lid housing portion 14 is rotated between approximately 1 and 179 degrees from main housing portion 12. Rotation of lid housing portion 14 between approximately 181 and 359 degrees from main housing portion 12 may place portable information handling system 10 in "tablet stand" and/or "tent" positions. In tablet stand and tent positions, a user can make inputs via touch panel portion of display 28 while viewing display 28. Rotation of lid housing portion 14 at approximately 180 degrees from main housing portion 12 may place portable information handling system 10 in a "flat" position. A full 360 degree rotation of main housing portion 12 relative to lid housing portion 14 provides a "tablet" configuration having display 28 exposed to accept touch inputs. In any position, user inputs may be communicated to an I/O subsystem and/or processor subsystem of the portable information handling system for processing, and then updated information may be communicated back via cable 36 to display 28 for displaying to the user.

Generally, a length (in the y-axis) and width (in the z-axis) of main housing portion 12 and lid housing portion 14 are driven by the size of display 28, which is integrated in lid housing portion 14. End users tend to prefer housings that are otherwise as minimal and non-intrusive as possible. Although end users generally understand that system length and width are driven by the end user's display size preference, one way to reduce a length and width of main housing portion 12 and lid housing portion 14 without reducing a size of display 28 may be to reduce a width of bezel 30. Furthermore, end users may prefer to minimize system height (in the x-axis) so that an information handling system remains as portable as possible when in a closed position or in a tablet position. Minimizing system height may include minimizing a thickness of both main housing portion 12 and lid housing portion 14, and components therein.

Minimizing system height may also include minimizing a size of hinge assembly 34. Even in reduced height systems, hinge assembly 34 must provide sufficient functionality to provide a reliable end user experience. For example, hinge assembly 34 should be robust enough to withstand repeated rotational cycles of the main and lid housing portions relative to each other. Additionally, hinge assembly 34 should also have sufficient internal friction or mechanical resistance to retain lid housing portion 14 in a particular angular position relative to main housing portion 12 so that the lid housing portion 14 will generally stay in a position set by the end user.

In order to implement these functions of hinge assembly 34 while also reducing size of hinge assembly 34 for use in reduced height systems, other functions of hinge assembly may be omitted or diminished. For example, in larger form factor systems, a hinge assembly may include a detent mechanism. A detent mechanism may operate to mechanically resist or arrest rotation to retain a lid housing portion in particular positions relative to a main housing portion. For example, a detent mechanism may provide increased rotational resistance when lid housing portion is in a closed position. Increased resistance in a closed position may operate to prevent a lid housing portion from undesirably opening (e.g., not staying flush against the main housing portion) when a system has be closed for storage. Similarly, a detent mechanism may provide increased rotational resistance when lid housing portion is in a tablet position. Increased resistance in a tablet position may improve the ability of an end user to hold a portable information handling system in tablet mode in one hand without a lid housing portion rotating relative to a main housing portion.

In a reduced height system, a detent mechanism may be optionally be removed to minimize a size of hinge assembly 34. However, it may still desirable for a portable information handling system 10 to include components operable to retain lid housing portion 14 in a closed position and in a tablet position. Accordingly, portable information handling system 10 may include a magnetic retention system in accordance with embodiments of the present disclosure. Specifically, main magnet assemblies 38 and lid magnet assemblies 40 may magnetically couple lid housing portion 14 to main housing portion 12. The force exerted by this magnetic coupling may operate to retain lid housing portion 14 in either a closed position or a tablet position.

FIG. 3A is a side cross sectional view of a portable information handling system 10 in a closed position, in accordance with some embodiments of the present disclosure. Portable information handling system 10 may include lid housing portion 14 and main housing portion 12, which may be rotationally coupled by hinge assembly 34. As discussed above with reference to FIG. 2, various components of portable information handling system 10 may be adapted for small form factor and reduced height systems. In some larger systems, lid magnet assemblies may be located in a portion of lid housing assembly covered by a bezel. In small bezel systems, however, there may be no room for lid magnet assemblies in portion of lid housing assembly covered by a bezel. Accordingly, in some embodiments, lid magnet assemblies 40 may be located behind display 28 within lid housing portion 14, or behind any other components retained within lid housing portion 14. In some embodiments, lid magnet assemblies 40 may be located in a portion of lid housing assembly covered by a bezel.

Locations of main magnet assemblies 38 may correspond to locations of lid magnet assemblies 40. A position of a main magnet assembly or a lid magnet assembly may be measured on the y-axis from a point on the magnet assembly closest to the hinge assembly in a particular rotational position. In some embodiments of the present disclosure, main magnet assemblies 38 may be located at the same y-axis position as lid magnet assemblies 40. In other embodiments, main magnet assemblies 38 may be located at a different y-axis position from lid magnet assemblies 40. Main magnet assemblies 38 may be above battery 32, or behind any other suitable component retained within main housing portion 12, or may not be behind any other components. Distance 44 shows that, in the exemplary embodiment illustrated in FIG. 3A, main magnet assemblies 38 have a y-axis offset from lid magnet assemblies 40. In some embodiments, distance 44 may be between 0 mm and 10 mm. In some embodiments, distance 44 may be approximately 4.8 mm. Likewise, distance 42 corresponds to an x-axis offset between main magnet assemblies 38 and lid magnet assemblies 40. In some embodiments, distance 42 may be between 0 mm and 10 mm. In some embodiments, distance 42 may be approximately 4.0 mm.

Main magnet assemblies 38 and lid magnet assemblies 40 may experience a magnetic force between the magnets when in the closed position ("closed magnetic coupling force"). A closed magnetic coupling force may be correlated with a y-axis offset between a main magnet assembly and a lid magnet assembly. For example, if an x-axis offset and z-axis offset are fixed, the closed magnetic coupling force between a main magnet assembly and a lid magnet assembly may decrease as a y-axis offset increases. Accordingly, a y-axis offset may be selected to provide a suitable level of closed magnetic coupling force so that lid housing portion 14 generally remains in a closed position unless changed by a user. Similarly, closed magnetic force may be correlated with an x-axis offset between a main magnet assembly and a lid magnet assembly. For example, if a y-axis offset and an x-axis offset are increased, the closed magnetic coupling force between these assemblies may reduce. Accordingly, an x-axis offset may be selected to provide a suitable level of closed magnetic coupling force so that lid housing portion 14 generally remains in a closed position unless changed by a user.

FIG. 3B is a side cross sectional view of a portable information handling system in a tablet position, in accordance with some embodiments of the present disclosure. Similar to FIG. 3A, portable information handling system 10 may include lid housing portion 14 and main housing portion 12, which may be rotationally coupled by hinge assembly 34. The relative position for lid housing portion 14 is approximately 360 degrees so that portable information handling system 10 is configured as a tablet. Accordingly, display 28 may be exposed so that a user can interact with display 28.

In some embodiments, hinge assembly 34 may operate to change a y-axis offset between main magnet assemblies 38 and lid magnet assemblies 40 when lid housing portion 14 is rotated from a closed position to a tablet position. This type of hinge assembly may be used in reduced height and small form factor systems. Distance 54 represents a y-axis offset between main magnet assemblies 38 and lid magnet assemblies 40. In some embodiments, distance 54 may be between 0 mm and 10 mm. In some embodiments, distance 54 may be approximately 0 mm. Likewise, distance 42 corresponds to an x-axis offset between main magnet assemblies 38 and lid magnet assemblies 40. In some embodiments, distance 42 may be between 0 mm and 10 mm. In some embodiments, distance 42 may be approximately 4.0 mm. Similarly, distance 56 corresponds to an x-axis offset between main magnet assemblies 38 and lid magnet assemblies 40. In some embodiments, distance 56 may be between 0 mm and 10 mm. In some embodiments, distance 56 may be approximately 6.0 mm.

By comparing FIGS. 3A and 3B it may be seen that a y-axis offset may increase as lid housing portion 14 is rotated from a closed position to a tablet position.

In some embodiments, depending on the configuration of hinge assembly 34, hinge assembly 34 may operate to change a y-axis position of lid magnet assembly 40 in the opposite direction than that illustrated in FIGS. 3A and 3B. Furthermore, in some embodiments, a y-axis offset may decrease as lid housing portion 14 is rotated from a closed position to a tablet position. Whether a y-axis offset is increased or decreased may depend on how hinge assembly changes the relative y-axis offset, and on the relative locations of main magnet assemblies 38 and lid magnet assemblies 40 in a closed position. For example, if lid magnet assemblies 40 were farther away than main magnet assemblies 38 from hinge assembly 34 in a closed position, and if hinge assembly 34 operated to move lid magnet assemblies 40 closer to hinge assembly 34 relative to main magnet assemblies 38, a y-axis offset may be reduced.

As a y-axis offset between main magnet assemblies 38 and lid magnet assemblies 40 increases, a magnetic coupling force in the tablet position ("tablet magnetic coupling force'") between these assemblies may reduce. Accordingly, a y-axis offset may be selected to provide a suitable level of tablet magnetic coupling force so that lid housing portion 14 generally remains in a tablet position unless changed by a user. Similarly, as an x-axis offset between main magnet assemblies 38 and lid magnet assemblies 40 increases, the tablet magnetic coupling force between these assemblies may reduce. Accordingly, an x-axis offset may be selected to provide a suitable level of tablet magnetic coupling force so that lid housing portion 14 generally remains in a tablet position unless changed by a user.

A comparison of FIGS. 3A and 3B illustrates two changes in relative positioning of main magnet assemblies 38 and lid magnet assemblies 40. For example, in a tablet position, a y-axis offset between main magnet assemblies 38 and lid magnet assemblies 40 may be larger than in a closed position. Similarly, in a tablet position, an x-axis offset between main magnet assemblies 38 and lid magnet assemblies 40 may be smaller than in a closed position. Accordingly, when transitioning from a closed position to a tablet position, main magnet assemblies 38 and lid magnet assemblies 40 may move farther away in along the y-axis and closer together along the x-axis. Accordingly, main magnet assemblies 38 and lid magnet assemblies 40 may be located so that closed magnetic coupling force is approximately the same as tablet magnetic coupling force or so that at least both magnetic coupling forces are sufficient to retain the respective housing portions in the proper position. In other embodiments, magnet assemblies 38 and lid magnet assemblies 40 may be located so that closed magnetic coupling force is larger than tablet magnetic coupling force. In other embodiments, magnet assemblies 38 and lid magnet assemblies 40 may be located so that closed magnetic coupling force is smaller than tablet magnetic coupling force.

Figure 4:
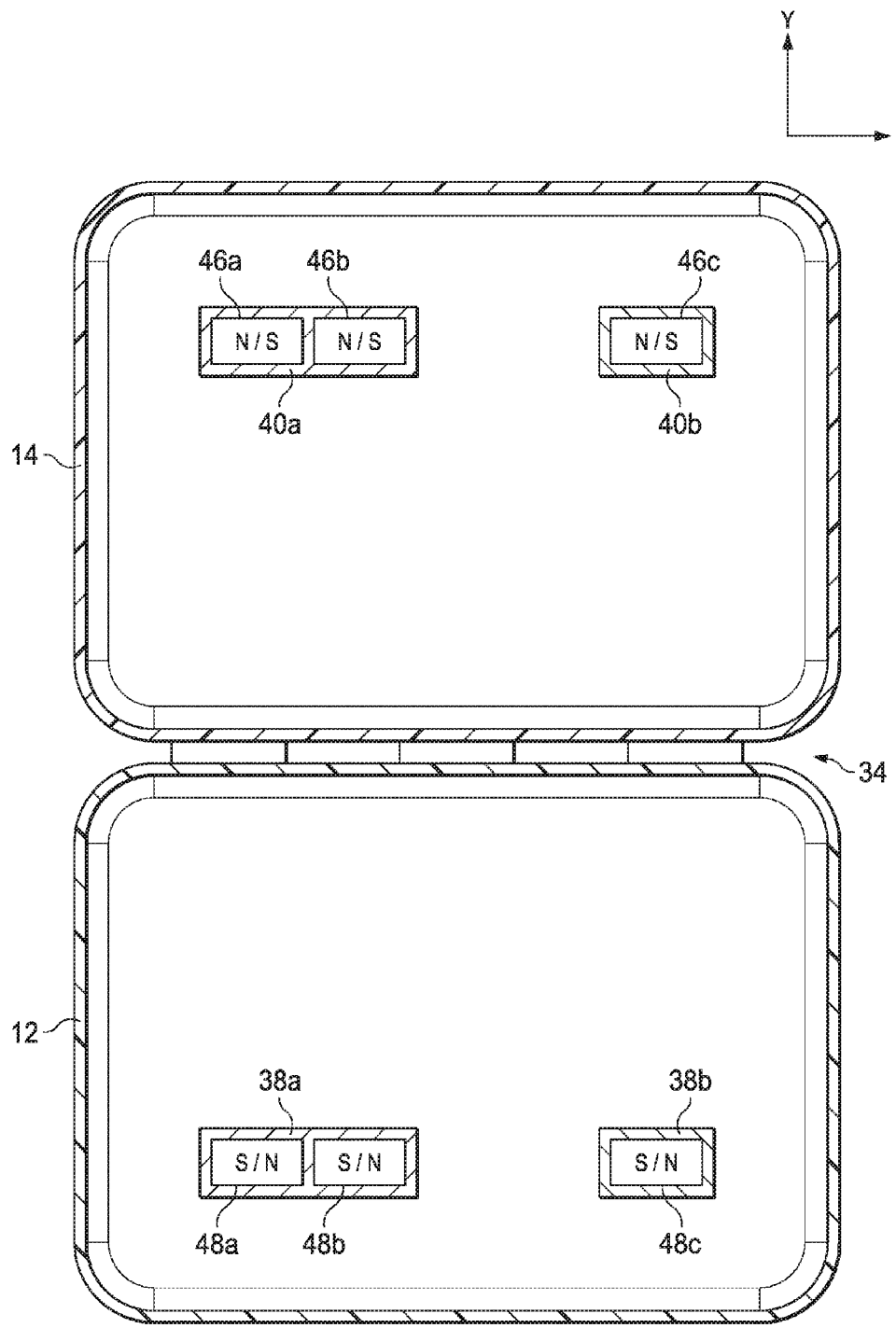
FIG. 4 is a top cross sectional view of a portable information handling system in a flat position, in accordance with some embodiments of the present disclosure.

FIG. 4 is a top cross sectional view of a portable information handling system in a flat position, in accordance with some embodiments of the present disclosure. Similar to FIG. 3A, portable information handling system 10 may include lid housing portion 14 and main housing portion 12, which may be rotationally coupled by hinge assembly 34. Lid magnetic assemblies 40 and main magnetic assemblies 38 may each include different numbers of magnets, the poles of those magnets may have different orientations, and each of the magnets may be formed from different materials. Lid magnet assemblies may include one or more magnets. For example, lid magnet assembly 40a includes magnet 46a and magnet 46b. Lid magnet assembly 40b includes magnet 46c. Likewise, main magnet assemblies may include one or more magnets. For example, main magnet assembly 38a includes magnet 48a and magnet 48b. Main magnet assembly 38b includes magnet 38c.

Each magnet in a lid magnet assembly may be associated with a corresponding magnet in a main magnet assembly. For example, each magnet may include two poles (commonly referred to as a "north" and "south" pole). A magnet in a lid magnet assembly may be installed so that the "north" and "south" poles are oriented in the opposite direction as the associated magnet in a main magnet assembly. Accordingly, associated magnets will attract, rather than repel, each other.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A portable information handling system comprising: a housing having a main housing portion and a lid housing portion; a hinge assembly rotatably coupling the main housing portion and the lid housing portion to rotate the lid housing portion through a plurality of angular positions relative to the main housing portion, the plurality of positions including: a closed position where the lid housing portion is rotated approximately 0 degrees relative to the main housing portion; and a tablet position where the lid housing portion is rotated approximately 360 degrees relative to the lid housing portion; a lid magnet assembly in the lid housing portion including a point on the lid magnet assembly closest to the hinge assembly in the tablet position that is located at a first position on a y-axis; and a main magnet assembly in the main housing portion including a point on the main magnet assembly closest to the hinge assembly in the tablet position that is located at a second position on a y-axis; wherein the second position is approximately the same as the first position; and wherein: a z-axis is defined to be parallel to the hinge assembly and to run through a rotational axis of the hinge assembly; the y-axis is defined to be perpendicular to the z-axis and parallel to the main housing portion; and an x-axis is defined to be perpendicular to the z-axis and perpendicular to the y-axis; and wherein: the lid magnet assembly in the lid housing portion includes a point on the lid magnet assembly closest to the hinge assembly in the closed position that is located at a third position on a y-axis; and the main magnet assembly in the main housing portion includes a point on the main magnet assembly closest to the hinge assembly in the closed position that is located at a fourth position on a y-axis; wherein the fourth position is different from the third position.

2. The system of claim 1, wherein the offset between the fourth position and third position is approximately 4.8 mm.

3. The system of claim 1, wherein:
in the closed position, the main magnet assembly is separated from the lid magnet assembly by a first offset in the x-axis;
in the tablet position, the main magnet assembly is separated from the lid magnet assembly by a second offset in the x-axis; and
the first offset is smaller than the second offset.

4. The system of claim 3, wherein:
the first offset is approximately 4 mm; and
the second offset is approximately 6 mm.

5. The system of claim 1, wherein:
the lid magnet assembly is attracted to the main magnet assembly by a closed magnetic coupling force when the lid housing portion is in the closed position;
the lid magnet assembly is attracted to the main magnet assembly by a tablet magnetic coupling force when the lid housing portion is in the tablet position;
the closed magnetic coupling force is approximately the same as the tablet magnetic coupling force.

6. The system of claim 1 wherein:
the lid housing portion includes a display; and
in the closed position, the display is located between the lid magnet assembly and the main magnet assembly.

7. The system of claim 1 wherein:
the main housing portion includes a battery; and
in the tablet position, the battery is located between the lid magnet assembly and the main magnet assembly.

8. The system of claim 1 wherein:
the lid magnet assembly includes one or more neodymium 45 magnets; and
the main magnet assembly includes one or more neodymium 45 magnets.

9. The system of claim 1, wherein the hinge does not include a detent mechanism.

10. A portable information handling system comprising: a housing having a main housing portion and a lid housing portion; a hinge assembly rotatably coupling the main housing portion and the lid housing portion to rotate the lid housing portion through a plurality of angular positions relative to the main housing portion, the plurality of positions including: a closed position where the lid housing portion is rotated approximately 0 degrees relative to the main housing portion; and a tablet position where the lid housing portion is rotated approximately 360 degrees relative to the lid housing portion; a lid magnet assembly in the lid housing portion; and a main magnet assembly in the main housing portion; wherein, in the closed position, the display is located between the lid magnet assembly and the main magnet assembly; wherein: the lid magnet assembly in the lid housing portion includes a point on the lid magnet assembly closest to the hinge assembly in the tablet position that is located at a first position on a y-axis; and the main magnet assembly in the main housing portion includes a point on the main magnet assembly closest to the hinge assembly in the tablet position that is located at a second position on a y-axis; wherein the second position is approximately the same as the first position; and wherein: a z-axis is defined to be parallel to the hinge assembly and to run through a rotational axis of the hinge assembly; the y-axis is defined to be perpendicular to the z-axis and parallel to the main housing portion; and an x-axis is defined to be perpendicular to the z-axis and perpendicular to the y-axis; and wherein: the lid magnet assembly in the lid housing portion includes a point on the lid magnet assembly closest to the hinge assembly in the closed position that is located at a third position on a y-axis; and the main magnet assembly in the main housing portion includes a point on the main magnet assembly closest to the hinge assembly in the closed position that is located at a fourth position on a y-axis; wherein the fourth position is different from the third position.

11. The system of claim 10 wherein:
the main housing portion includes a battery; and
in the tablet position, the battery is located between the lid magnet assembly and the main magnet assembly.

12. The system of claim 10, wherein the offset between the fourth position and third position is approximately 4.8 mm.

13. The system of claim 10, wherein: in the closed position, the main magnet assembly is separated from the lid magnet assembly by a first offset in the x-axis; in the tablet position, the main magnet assembly is separated from the lid magnet assembly by a second offset in the x-axis; and the first offset is smaller than the second offset.

14. The system of claim 13, wherein:
the first offset is approximately 4 mm; and
the second offset is approximately 6 mm.

15. The system of claim 10 wherein:
the lid magnet assembly is attracted to the main magnet assembly by a closed magnetic coupling force when the lid housing portion is in the closed position;
the lid magnet assembly is attracted to the main magnet assembly by a tablet magnetic coupling force when the lid housing portion is in the tablet position;
the closed magnetic coupling force is approximately the same as the tablet magnetic coupling force.

16. The system of claim 10, wherein:
in the lid magnet assembly includes one or more neodymium 45 magnets; and
the main magnet assembly includes one or more neodymium 45 magnets.

17. The system of claim 10, wherein the hinge does not include a detent mechanism.

* * * * *